(12) United States Patent
Furumura et al.

(10) Patent No.: US 9,262,996 B2
(45) Date of Patent: Feb. 16, 2016

(54) APPARATUS AND METHOD FOR DISPLAYING IMAGES

(71) Applicant: Sony Computer Entertainment Inc., Tokyo (JP)

(72) Inventors: Kyoko Furumura, Tokyo (JP); Shinichi Hirata, Kanagawa (JP); Takeshi Yamagishi, Kanagawa (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 13/804,186

(22) Filed: Mar. 14, 2013

(65) Prior Publication Data

US 2013/0314402 A1 Nov. 28, 2013

Related U.S. Application Data

(63) Continuation of application No. PCT/JP2011/004327, filed on Jul. 29, 2011.

(30) Foreign Application Priority Data

Oct. 5, 2010 (JP) ................................. 2010-225367

(51) Int. Cl.
*G06T 19/00* (2011.01)
*G06T 3/40* (2006.01)
(Continued)

(52) U.S. Cl.
CPC *G09G 5/14* (2013.01); *G03B 35/02* (2013.01); *G03B 37/00* (2013.01); *G06T 3/0062* (2013.01); *G06T 3/4038* (2013.01); *G06T 15/205* (2013.01); *G06T 19/006* (2013.01);
(Continued)

(58) Field of Classification Search
USPC .......................................... 345/419
See application file for complete search history.

(56) References Cited

U.S. PATENT DOCUMENTS 7,576,742 B2 8/2009 Kanematsu
2003/0012430 A1* 1/2003 Risson .......................... 382/165
(Continued)

FOREIGN PATENT DOCUMENTS

CN 1706181 A 12/2005
JP 2003143505 A 5/2003
(Continued)

OTHER PUBLICATIONS

International Search Report for the corresponding PCT Application No. PCT/JP2011/004327, dated Aug. 30, 2011.
(Continued)

*Primary Examiner* — Ulka Chauhan
*Assistant Examiner* — Schiller Hill
(74) *Attorney, Agent, or Firm* — Matthew B. Dernier, Esq.

(57) ABSTRACT

A mask region extraction unit extracts a region that is to be masked in a panoramic image. A mask processing unit generates the object image where the region to be masked in the panoramic image is masked. A positioning unit adjusts the direction of a spherical image to the shooting direction of the object image. A mapping processing unit maps the mask-processed object image and the spherical image onto a three-dimensional (3D) object space as textures. A 3D image generator generates a 3D panoramic image, when the 3D panoramic image is viewed in a specified line of sight in such a manner so as to regard the shooting location of the panoramic as a viewpoint position.

12 Claims, 12 Drawing Sheets

(51) Int. Cl.
- *G09G 5/14* (2006.01)
- *G03B 35/02* (2006.01)
- *G03B 37/00* (2006.01)
- *H04N 13/02* (2006.01)
- *H04N 21/234* (2011.01)
- *H04N 21/431* (2011.01)
- *H04N 21/44* (2011.01)
- *H04N 21/4545* (2011.01)
- *H04N 21/81* (2011.01)
- *H04N 21/84* (2011.01)
- *G06T 3/00* (2006.01)
- *G06T 15/20* (2011.01)

(52) U.S. Cl.
CPC ..... *H04N13/0278* (2013.01); *H04N 21/23412* (2013.01); *H04N 21/4318* (2013.01); *H04N 21/44012* (2013.01); *H04N 21/45455* (2013.01); *H04N 21/8146* (2013.01); *H04N 21/84* (2013.01)

(56) References Cited

U.S. PATENT DOCUMENTS

| | | |
|---|---|---|
| 2003/0122949 A1 | 7/2003 | Kanematsu |
| 2006/0140508 A1 | 6/2006 | Ohgishi et al. |
| 2006/0204232 A1* | 9/2006 | Weinberg et al. ............... 396/50 |
| 2009/0244064 A1* | 10/2009 | Inokuchi et al. ............... 345/420 |
| 2010/0091014 A1* | 4/2010 | Shenkar et al. ............... 345/419 |

FOREIGN PATENT DOCUMENTS

| | | |
|---|---|---|
| JP | 2005175587 A | 6/2005 |
| WO | 2004039068 A1 | 5/2004 |

OTHER PUBLICATIONS

International Preliminary Examination Report on Patentability with Written Opinion for the corresponding PCT Application No. PCT/JP2011/004327, dated May 8, 2013.

Office Action for the corresponding Japanese Patent Application No. 2010-225367, dated Jan. 8, 2013.

Office Action for the corresponding Chinese Patent Application No. 2011800479769, dated Jun. 3, 2015.

* cited by examiner

APPARATUS AND METHOD FOR DISPLAYING IMAGES

BACKGROUND OF THE INVENTION

1. Field of the Invention

The present invention relates to an apparatus and a method for displaying images.

2. Description of the Related Art

With the prevalence of digital still cameras and digital video cameras, there are increased occasions where still images or moving images having been shot are stored in a computer for later viewing, processing, or displaying on the screen of a game device or a television system. It is also popularly done that the shot moving images are uploaded to a posting site on the Internet so as to share them with the other users.

Among the digital cameras are those capable of shooting panoramic images, which allow the image taking of panoramic images of wide view angle with perfect ease. Also in wide use are software tools that can generate a panoramic image by stitching together a plurality of images shot by a digital camera from different shooting directions.

There is a site named "360cities" (http://www.360cities.net) that accepts the posting of panoramic images shot by users and show them on the Internet, so that the users around the world can view the panoramic images posted.

A panoramic image is an image shot as viewed in all directions from a shooting location. When such a panoramic image is shot outdoors, it is often the case that the sky is opened up above a person taking the image of a panoramic view and only the sky is captured on a top area of the panoramic image shot. If such an image is processed so that some kind of visual effect can be created in the sky region occupying a high proportion of the panoramic image, it can be expected that the panoramic image will be more refreshing than otherwise and a diversity will be brought to the panoramic image. Also, something excitingly unpredictable may be likely to happen and amusing factor may also be likely to be added if the rendering is done such that another object is inserted into the panoramic image shot so as to create a new panoramic image incorporating a virtually nonexistent object rendered therein.

SUMMARY OF THE INVENTION

The present invention has been made in view of these problems, and a general purpose thereof is to provide a technology for processing images and displaying the thus processed images.

In order to resolve the above-described problems, an image display apparatus according to one embodiment of the present invention includes: a storage configured to store an object image, associated with information on a shooting direction, and a spherical image, associated with directional information; a mask region extraction unit configured to extract a region that is to be masked in the object image; a mask processing unit configured to generate the object image where the region to be masked in the object image is masked; a positioning unit configured to adjust the directional information of the spherical image to be the shooting direction of the object image; a mapping processing unit configured to position the spherical image and then configured to map the mask-processed object image and the spherical image onto a three-dimensional (3D) object space as a texture; a three-dimensional (3D) image generator configured to generate a three-dimensional (3D) object image, when the 3D object image mapped by the mapping processing unit is viewed in a specified line of sight in such a manner so as to regard a shooting location of the object image as a viewpoint position; and a display control unit configured to display the 3D object image on a screen.

Another embodiment of the present invention relates also to an image display apparatus. The apparatus includes: a storage configured to store an object image, associated with information on a shooting direction, and a virtual image, associated with directional information; a mask region extraction unit configured to extract a region that is to be masked in the object image; a mask processing unit configured to generate the object image where the region to be masked in the object image is masked; a positioning unit configured to adjust the directional information of the virtual image to the shooting direction of the object image; and a display control unit configured to position the virtual image and then configured to display on a screen an augmented-reality image where the virtual image is superimposed onto the mask-processed image.

Still another embodiment of the present invention relates to a method for displaying images. The method includes: reading out, by a processor, an object image and a spherical image to be displayed, from a storage device for storing the object image, associated with information on a shooting direction, and the spherical image, associated with directional information; specifying, by a processor, a region that is to be masked in the object image; adjusting, by a processor, the directional information of the spherical image to the shooting direction of the object image; and rendering, by a processor, after positioning the spherical image in a manner such that the spherical image is superimposed onto the region to be masked in the object image.

Optional combinations of the aforementioned constituting elements, and implementations of the invention in the form of methods, apparatuses, systems, computer programs, data structures, recording media and so forth may also be effective as additional modes of the present invention.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which.

DETAILED DESCRIPTION OF THE INVENTION

A description will be given of an outline of a preferred embodiment. A region where the sky is captured in a panoramic image is extracted and then a mask processing is performed on this extracted sky region to make transparent the sky region. A sphere or celestial sphere is assumed outside a three-dimensional (3D) panoramic space, such as a panoramic sphere, onto which a panoramic image is mapped, and a sky image and the like are prepared beforehand as a spherical image. And the spherical image is mapped onto the 3D panoramic space into which the panoramic image is mapped. This generates a 3D panoramic image where the spherical image has been pasted to the sky region, which is clipped and now transparent, in the panoramic image. Another object, which is not captured in the panoramic image, may be placed in the sphere and then the thus generated 3D panoramic image including this object may be mapped onto the 3D panoramic image, so that the object can be inserted into the generated 3D panoramic image. Note that a plurality of spheres may be provided and those spheres may be mapped onto the 3D panoramic space. For example, a sphere composed of clouds and a sphere composed of stars may be provided; images of clouds may be prepared for the sphere of clouds and celestial bodies such as the sun, the moon, and stars may be prepared for the sphere of stars.

Figure 1:
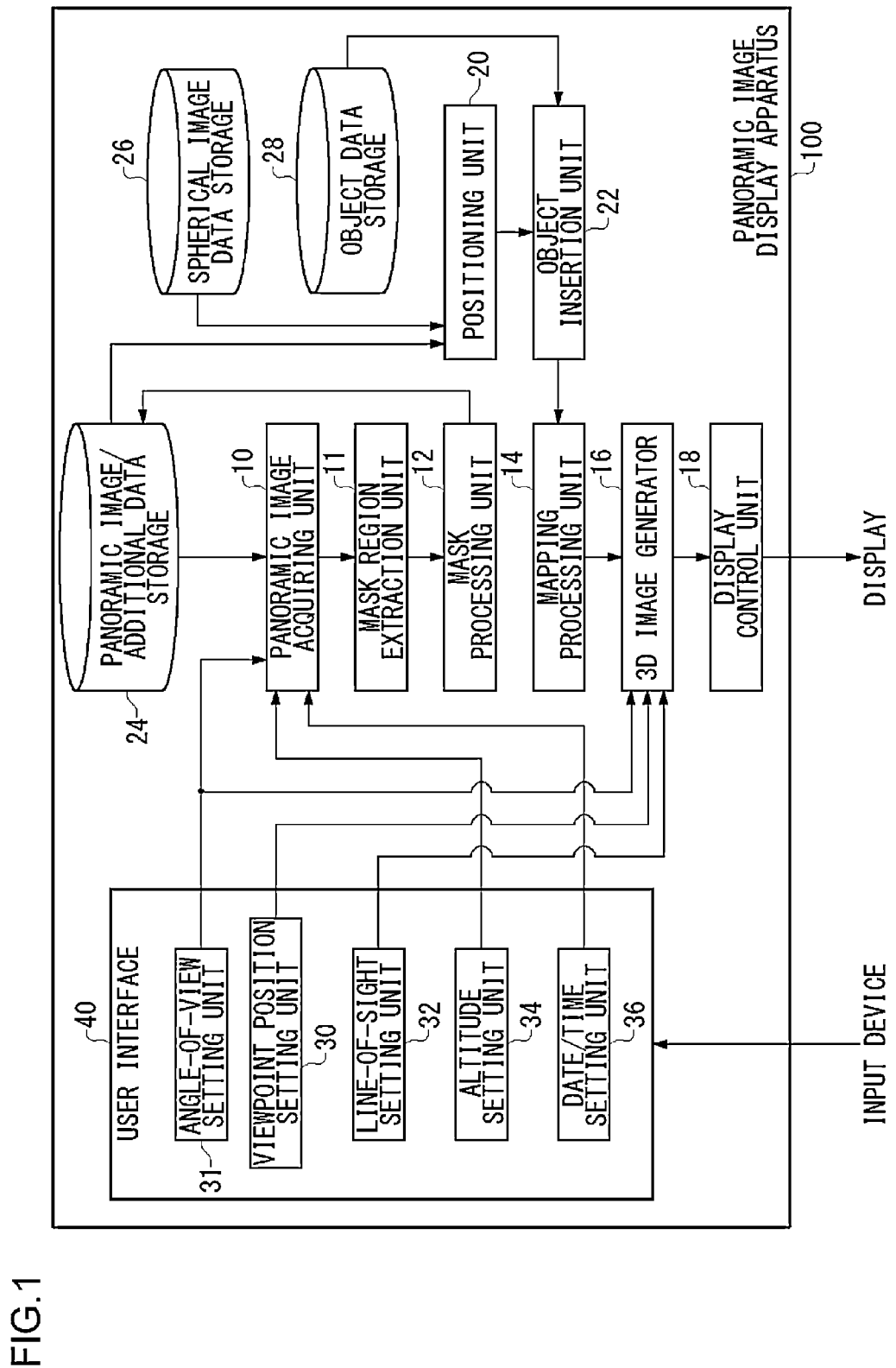
FIG. 1 is a configuration diagram of a panoramic image display apparatus according to an embodiment.

FIG. 1 is a configuration diagram of a panoramic image display apparatus 100 according to a preferred embodiment. For example, the panoramic image display apparatus 100 as shown in FIG. 1 may be functionally configured such that hardware, software or a combination of both is implemented to a personal computer, a game device, a portable device, a mobile terminal and so forth. Part of such functional components may be implemented in a client, so that the panoramic image display apparatus 100 may be realized as a server-client system via a network.

A panoramic image/additional data storage 24 stores panoramic images having information on shooting locations and information on shooting orientations associated with each other. The additional data, such as information on shooting locations and shooting orientations, may be added directly to a data file of panoramic images, or may be managed as a separate file from the panoramic images.

The information on shooting locations includes, for instance, information on latitudes and longitudes which is given by GPS (Global Positioning System). The information on shooting orientation includes, for instance, information on the azimuth (angle of orientation) of the center point of a panoramic image obtained from an azimuth sensor, and may also additionally include information on the elevation angle and roll angle of a camera at the time of shooting.

If the azimuth of the center point of a panoramic image is given as information on a shooting orientation, then it is possible to calculate the orientation of an arbitrary point of the panoramic image based on the angle of panning the camera to the right or left. The panoramic images may have, as the information on the shooting orientations, the coordinate values of pixels in the orientations of true north, true south, true east, and true west of the panoramic images which are calculated based on the azimuths and pan angles of the center points of the panoramic images.

A panoramic image acquiring unit 10 acquires a panoramic image to be displayed from the panoramic image/additional data storage 24. The panoramic image to be displayed is identified as the user specifies a shooting location on a map or the like.

A mask region extraction unit 11 extracts a region that is to be masked in an object to be displayed. The region to be masked is a sky region captured in a panoramic image, for instance. The sky region may be determined to be as such, based on color information of the panoramic image. Since the sky is often opened up way above a person who takes the image of a panoramic view, the sky is often detected as a region widely extending continuously at a wide elevation angle of a camera.

Information on the elevation angle of the camera at the time of shooting is appended to the panoramic image. Thus, the mask region extraction unit 11 may determine the horizon position in the panoramic image based on the information on the elevation angle of the camera and may extract the sky region in an area above the horizon. Or if the elevation angle of the camera is greater than a predetermined threshold value, the area will definitely be above the horizon and therefore the sky region may be extracted within such the area. This can avoid the error of mistakenly extracting an area other than the area above the horizon, as the sky region, even though there is a region, below the horizon, whose color is similar to the color of the sky.

A mask processing unit 12 generates a panoramic image where a region, to be masked, which is extracted by the mask region extraction unit 11 has been masked. If the mask region extraction unit 11 extracts the sky region as the region to be masked, the panoramic image will be subjected to the mask processing with the extracted sky region as a mask so as to generate a panoramic image with the sky region masked. The mask processing performed on the panoramic image is achieved such that a region specified as the mask in the original panoramic image is made transparent or an image with said region clipped is generated. The mask processing used herein may use a two-level mask, where the pixel values in a mask region. However, this should not be considered as limiting and, for example, a multi-level mask may be used where the pixel values in the mask region are alpha-blended. The mask processing unit 12 stores the panoramic image after the mask processing in the panoramic image/additional data storage 24.

Stored in a spherical image data storage 26 is spherical image data that is to be superimposed onto a panoramic image after the mask processing. The sphere (celestial sphere) lies outside the 3D panoramic space into which the panoramic image is mapped, and an image of the sky set in the surface of the sphere serves as a spherical image. Spherical images as viewed from various points are stored, in the spherical image data storage 26, in association with the latitude and longitude of the viewpoints. The spherical image may contain images of celestial bodies such as the sun, the moon, and stars and an image of clouds, for instance, and may also contain the moving images of celestial bodies and clouds based on a motion model of celestial body and a meteorological model, respectively. The spherical images may be those produced based on an actual picture or moving images or those produced based on computer graphics.

A positioning unit 20 adjusts the direction of a spherical image to the shooting direction of the panoramic image after the mask processing. More specifically, the center of a sphere, whose center is the latitude and longitude, is aligned to the center of the 3D panoramic space into which the panoramic image is mapped. Then, for example, with the direction of the North Star used as a reference, the rotational angle of the spherical image is computed so that the rotational angle thereof is equivalent to or matches the shooting direction determined by the pan angle and tilt angle of the panoramic image, and then the spherical image is rotated by the thus computed rotational angle.

Stored in an object data storage 28 is 3D data of objects to be inserted into a panoramic image. An object may be a static object that stands still at a predetermined latitude, longitude and altitude and may also be a dynamic object that moves in a 3D space based on a motion model.

An object insertion unit 22 places an object, which is to be inserted to the panoramic image, in a designated spatial position. The object may be placed between the sphere and the 3D panoramic space into which the panoramic image is mapped, namely outside the 3D panoramic space. Also, the object may be placed within the 3D panoramic space. Note that the insertion of an object by the object insertion unit 22 is optional.

A positioning unit 20 positions the panoramic image and the spherical image before a mapping processing unit 14 maps the mask-processed panoramic image and the spherical image into the 3D panoramic space as textures.

In the case of a spherical, or omnidirectional (celestial), panoramic image, a sphere is assumed as the 3D panoramic space and a panoramic image is texture-mapped onto the sphere by a sphere mapping. Or a cube may be assumed as the 3D panoramic space and then a panoramic image may be texture-mapped onto the surface of cube by a cube mapping. Also, in the case where the panoramic image does not have any component in tilt directions and spreads only in the panning directions, a cylinder may be assumed as the 3D panoramic space, and the panoramic image may be texture-mapped onto the surface of the cylinder by a texture mapping. The same applies to the case where the panoramic image does not have any component in the panning directions and spreads only in tilt directions.

A mapping processing unit 14 maps the spherical image into the 3D panoramic space and then maps the panoramic image by superimposing mask-processed panoramic image onto the 3D panoramic space. This produces an image, where part of the spherical image has been pasted to a mask region within the panoramic image, onto the 3D panoramic space.

If an object is placed inside or outside the 3D panoramic space by the object insertion unit 22, the mapping processing unit 14 will also map the object placed thereby into the 3D panoramic space.

If the object is placed outside the 3D panoramic space, the mapping processing unit 14 will map the object into the 3D panoramic space and then map the panoramic image by superimposing mask-processed panoramic image onto the 3D panoramic space. Thereby, the object is pasted to the sky region of the panoramic image and, if the object overlaps with a building or the like captured in the panoramic image, the object is rendered so that the object is hidden behind or obscured by the building.

If the object is placed inside the 3D panoramic space, the mapping processing unit 14 will map the object into the 3D panoramic space and then map the object by superimposing object onto the 3D panoramic space. Thereby, the object is superimposed onto the 3D panoramic image and, if the object overlaps with a building or the like captured in the panoramic image, the object is rendered in front of the building.

A 3D image generator 16 generates a three-dimensional (3D) panoramic image when the 3D panoramic space having a panoramic image, a spherical image and an object mapped thereon by the mapping processing unit 14 is viewed in a specified line of sight. When the 3D panoramic space is a sphere, the viewpoint is placed at the center of the sphere. When the 3D panoramic space is a cube, the viewpoint is placed at the center of the interior of the cube. And when the 3D panoramic space is a cylinder, the viewpoint is placed on the center axis of the cylinder. The viewpoint is the location where the panoramic image to be displayed is shot, and the line of sight is the direction in which the surrounding area is viewed and is thus identified by the azimuth and the elevation angle. The 3D image generator 16 generates a 3D image when the 3D panoramic space is viewed in the line of sight identified by the azimuth and the elevation angle.

A display control unit 18 has a 3D panoramic image or a map image thus generated displayed on a screen of the display unit.

Figure 2:
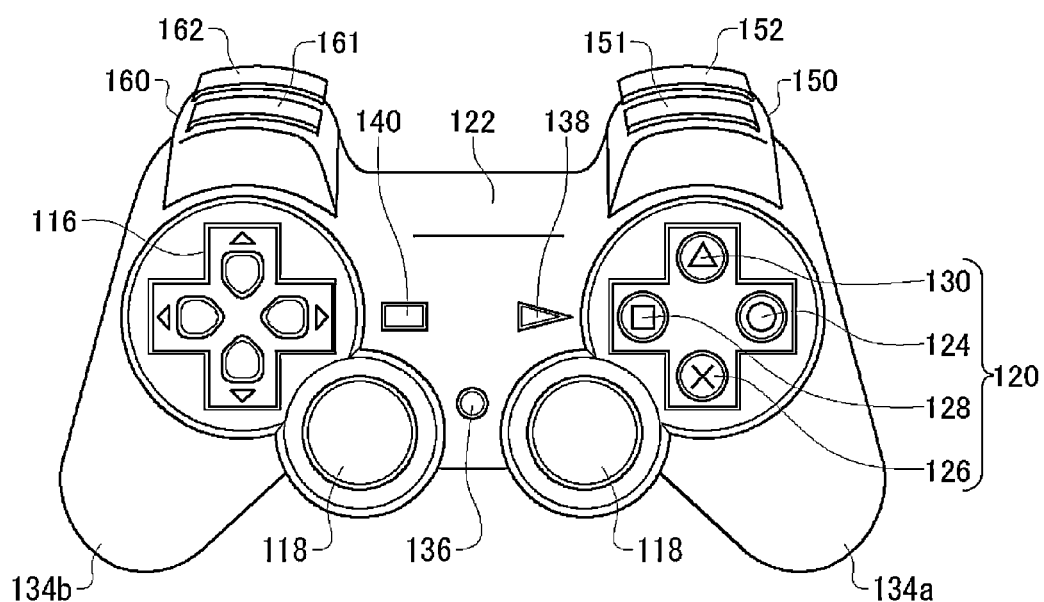
FIG. 2 shows a structure of a controller, connected to the panoramic image display apparatus of FIG. 1, which is an example of an input device.

A user interface 40 is a graphical user interface through which the user can manipulate the graphics displayed on the screen of a display using an input device. The user interface 40 receives user instructions on the map or 3D panoramic image displayed on the screen from the input device which may be a controller of a game device, a mouse, a keyboard, or the like. FIG. 2 shows a controller 102 as an example of the input device, whose construction will be discussed in detail later.

The user interface 40 instructs the panoramic image acquiring unit 10 to acquire a specified panoramic image from the panoramic image/additional data storage 24.

The user can input instructions to change the line of sight for viewing the 3D panoramic space by operating an analog stick 118 or direction keys 116 of the controller 102, for instance. A line-of-sight setting unit 32 of the user interface 40 gives a line of sight instructed by the user to the 3D image generator 16. The 3D image generator 16 generates an image when the 3D panoramic space is viewed in a specified line of sight.

An angle-of-view setting unit 31 sets an angle of view when the user has performed a zoom operation on the panoramic image being displayed and gives the information of the angle of view thus set to the panoramic image acquiring unit 10 and the 3D image generator 16. Where panoramic images of different angles of view are stored in the panoramic image/additional data storage 24, the panoramic image acquiring unit 10 reads out a panoramic image of an angle of view closest to the set angle of view and changes the panoramic image to be displayed. The 3D image generator 16 realizes the visual effects of zoom-in and zoom-out by enlarging or reducing the 3D panoramic image according to the set angle of view.

A panoramic image may have information on the shooting altitude, and the panoramic image/additional data storage 24 may store panoramic images shot at different altitudes at the same shooting location. In such a case, the user can input instructions to change the altitude by operating L1/L2 buttons 161 and 162 provided on the left front of the casing of the controller 102, for instance. Pressing the L1 button 161 will give an instruction to raise the altitude, and pressing the L2 button 162 will give an instruction to lower the altitude.

The display control unit 18 may indicate to the user, for instance, with small arrows at the top and bottom portions of the screen that the panoramic image currently being displayed has panoramic images shot at different altitudes at the same shooting location. An arrow facing upward in the top portion of the screen indicates the presence of a panoramic image shot at a higher altitude than the current one, and an arrow facing downward in the bottom portion of the screen indicates the presence of a panoramic image shot at a lower altitude than the current one.

Upon receipt of an instruction from the user to change the altitude, the altitude setting unit 34 of the user interface 40 instructs the panoramic image acquiring unit 10 to acquire a panoramic image corresponding to the specified altitude, despite the same latitude and longitude, from the panoramic image/additional data storage 24. The panoramic image acquiring unit 10 acquires a panoramic image of a higher shooting altitude than the panoramic image currently being displayed when the L1 button 161 is pressed, and acquires a panoramic image of a lower shooting altitude than the current one when the L2 button 162 is pressed.

When a display is produced by switching to a panoramic image of a different shooting altitude, the display control unit 18 may give a special effect to the image so that the user may have a sense of riding an elevator up or down. For example, when switching to a panoramic image of a higher altitude, the panoramic image currently being displayed can be scrolled downward, thereby having the panoramic image of a higher altitude descend from above with the result that the user may have a sense of having risen upstairs.

A panoramic image contains information on the shooting date and time, and the panoramic image/additional data storage 24 may store panoramic images shot at different dates and times at the same shooting location. In such a case, the user can input instructions to change the date and time by operating R1/R2 buttons 151 and 152 provided on the right front of the casing of the controller 102, for instance. Pressing the R1 button 151 will give an instruction to shift to a later date and time, and pressing the R2 button 152 will give an instruction to shift to an earlier date and time.

The display control unit 18 may indicate to the user, for instance, with watch and calendar icons in the corner of the screen that the panoramic image currently being displayed has panoramic images shot at different dates and times. Watch icons may be displayed to indicate the presence of panoramic images for different times of day such as morning, noon, and night, whereas calendar icons may be displayed to indicate the presence of panoramic images for different seasons such as spring, summer, autumn, and winter.

Upon receipt of an instruction from the user to change the date and time, the date/time setting unit 36 of the user interface 40 instructs the panoramic image acquiring unit to acquire a panoramic image corresponding to a specified date and time at the same shooting location from the panoramic image/additional data storage 24. The panoramic image acquiring unit 10 acquires a panoramic image of a later shooting date and time than the panoramic image currently being displayed when the R1 button 151 is pressed, and acquires a panoramic image of an earlier shooting date and time than the current one when the R2 button 152 is pressed.

Thus, it is possible to switch the panoramic image being displayed to panoramic images of a different time of day or season at the same shooting location, for example, from one shot in the morning to one shot at night, or from one shot in spring to one shot in autumn. In changing the panoramic image, the display control unit 18 may give an effect of fade-in and fade-out to the image.

A viewpoint position setting unit 30 set the shooting location of a panoramic image as a viewpoint position and conveys it to the 3D image generator 16. The line-of-sight setting unit 32 sends the specified line-of-sight to the 3D image generator 16.

FIG. 2 shows a structure of a controller, connected to the panoramic image display apparatus of FIG. 1, which is an example of an input device. The panoramic image display apparatus 100 may be a game device, for instance.

The controller 102 has a plurality of buttons and keys to receive control inputs to the panoramic image display apparatus 100. As the user operates on the buttons or keys of the controller 102, their operation inputs are transmitted to the panoramic image display apparatus 10 through wireless or wired connections.

Provided on a casing top surface 122 of the controller 102 are a group of arrow keys 116, analog sticks 118, and a group of operation buttons 120. The group of direction keys 116 include "up-", "down-", "left-", and "right-" direction indication keys. The group of operation buttons 120 include a circle button 124, a cross button 126, a square button 128, and a triangle button 130.

The user holds a left-hand grip 134b with the left hand and holds a right-hand grip 134a with the right hand, and operates the group of direction keys 116, the analog sticks 118, and the group of operation buttons 120 on the casing top surface 122.

Provided on a front side of the controller 102 are a right-hand operation part 150 and a left-hand operation part 160. The right-hand operation part 150 includes an R1 button and an R2 button, whereas the left-hand operation part 160 includes an L1 button 161 and an L2 button 162.

The user can shift a pointer displayed on the screen in vertical and horizontal directions by operating the directional key group 116. For example, when selecting one of a plurality of markers displayed within a panoramic image, the user can shift the pointer between the plurality of markers on the screen by operating the directional key group 116. The user can select a desired marker by pressing the circle button 124 when the pointer has come upon the marker.

Different functions may be assigned to the respective buttons of operation buttons 120 by a panoramic image display application program. For example, the function to specify the display of a menu is assigned to the triangle button 130, the function to specify the cancel of a selected item is assigned to the cross button 126, the function to specify the determination of a selected item is assigned to the circle button, and the function to specify the display/non-display of table of contents or the like is assigned to the square button 128.

The analog sticks 118 have means to output analog values as they are tipped by the user. The controller 102 sends an analog output signal corresponding to the direction and amount of tipping of the analog stick 118 to the panoramic image display apparatus 100. For example, the user can shift the viewpoint in a desired direction within a 3D panoramic image shown on the display by tipping the analog stick 118 in the desired direction.

The casing top surface 122 is further provided with an LED button 136, a selector button 140, and a start button 138. The LED button 136 is used as the button for the display of the menu screen on the display, for instance. The start button 138 is the button with which the user instructs the start of a panoramic image display application, the start or pause of playback of a panoramic image, or the like. The selector button 140 is the button with which the user instructs a selection from a menu display shown on the display or the like.

FIGS. 3A to 3D are illustrations with which to explain the mechanism and shooting directions of an omnidirectional image shooting system 230 used to shoot panoramic images.

Figure 3A:
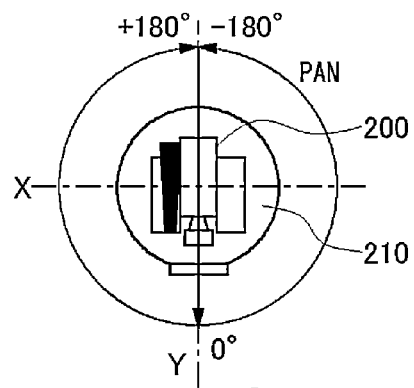
FIGS. 3A to 3D are illustrations with which to explain the mechanism and shooting directions of an omnidirectional image shooting system used to shoot panoramic images.
Figures 3B, 3C:
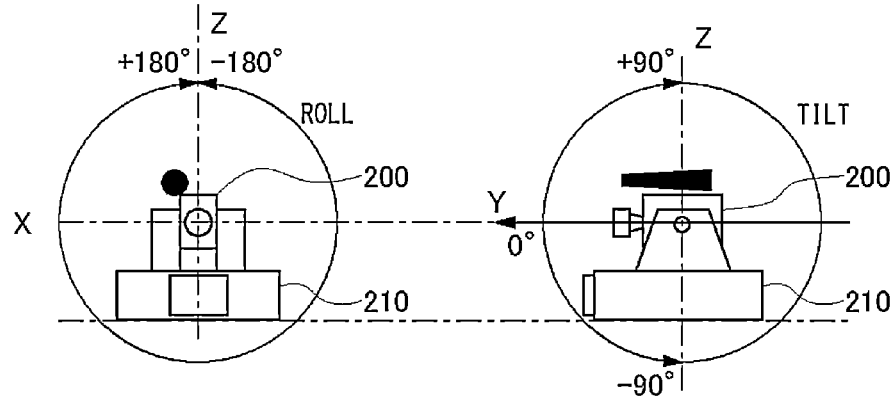
Figure 3D:
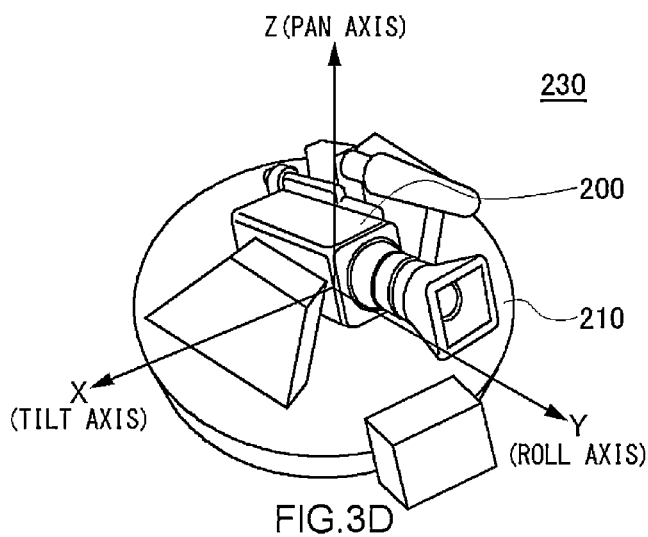

As shown in FIG. 3D, a camera 200 in the omnidirectional image shooting system 230 is secured onto a control disk 210. And a camera's pan angle can be changed as the control disk 210 is rotated around a Z axis, a camera's tilt angle can be changed as the control disk 210 is rotated around an X axis, and a camera's roll angle can be changed as the control disk 210 is rotated around a Y axis. The Z axis herein is the vertical axis (gravitational direction axis).

FIG. 3A is a top view of the camera 200 installed on the control disk 210. The initial position (Y-axis direction) of the control disk is pan angle 0°, and the pan angle can be changed within a range of −180° to +180° around the Z axis.

FIG. 3B is a front view of the camera 200 installed on the control disk 210. The horizontal state of the control disk 210 is roll angle 0°, and the roll angle can be changed within a range of −180° to +180° around the Y axis.

FIG. 3C is a side view of the camera 200 installed on the control disk 210. The horizontal state of the control disk 210 is tilt angle 0°, and the tilt angle can be changed within a range of −90° to +90° around the X axis.

In order to endow a panoramic image shot by the omnidirectional image shooting system 230 of FIG. 3D with information on the shooting orientations, it is necessary to record the orientations of the camera 200 at the time of image taking. For that purpose, the omnidirectional image shooting system 230 is provided with an azimuth sensor for measuring orientations and an acceleration sensor for measuring tilt angles. The ominidirectional image shooting system 230 is further provided with a GPS sensor or the like for measuring the shooting location and time.

Figure 4A:
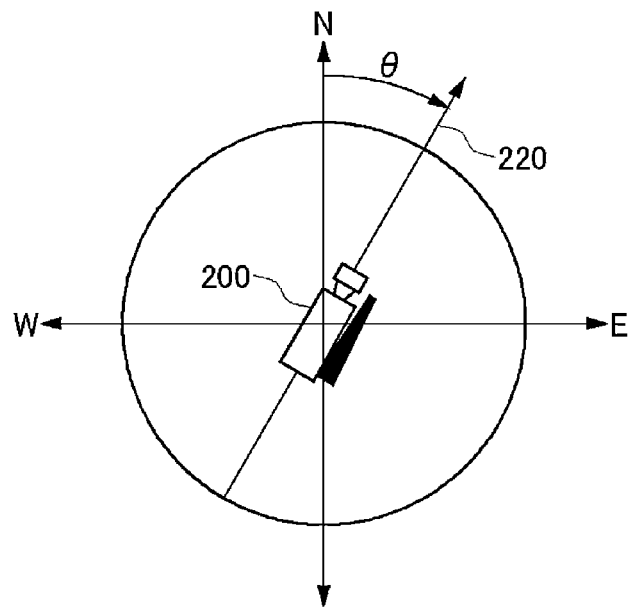
FIG. 4A is an illustration with which to explain azimuth angle θ of a camera.
Figure 4B:
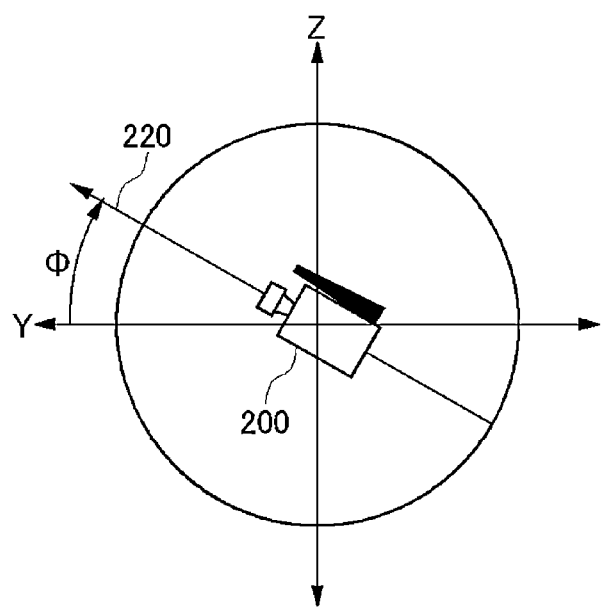
FIG. 4B is an illustration with which to explain elevation angle φ of a camera.

FIG. 4A is an illustration with which to explain azimuth angle θ of the camera 200, and FIG. 4B is an illustration with which to explain elevation angle φ of the camera 200. FIG. 4A is a top view of the camera 200, in which the camera 200 in an initial position of shooting faces a direction 220 which is azimuth angle θ displaced from true north to east. This direction is equal to pan angle 0°. In other words, the azimuth angle of the reference direction 220 of the pan angle is θ. When shooting a panoramic image, the image of an object is taken panoramically by changing the pan angle in a range of −180° to +180° with respect to the reference direction 220 of the azimuth angle θ.

FIG. 4B is a side view of the camera 200. The elevation angle φ is the direction of tilt 0°, which is an angle where an upper direction is defined to be positive in relation to the Y-axis direction, when the camera 200 is rotated around the X axis. Normally, the elevation angle φ is 0° since the image taking is done with the camera 200 set in a horizontal position. To shoot a spherical panoramic image, however, it is necessary to take the images of the object by changing the elevation angle φ with the tilt of the camera.

Figure 5A:
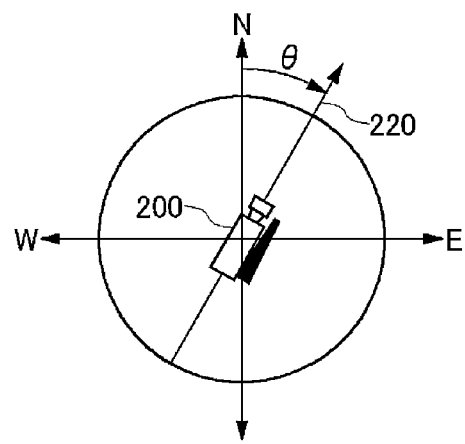
FIGS. 5A to 5C are illustrations with which to explain a panoramic image shot when an initial position of a camera is in a direction of azimuth angle θ.
Figure 5B:
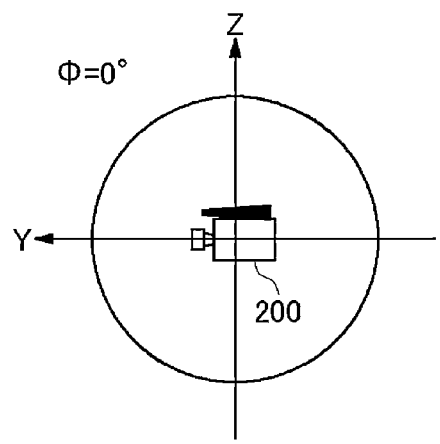
Figure 5C:
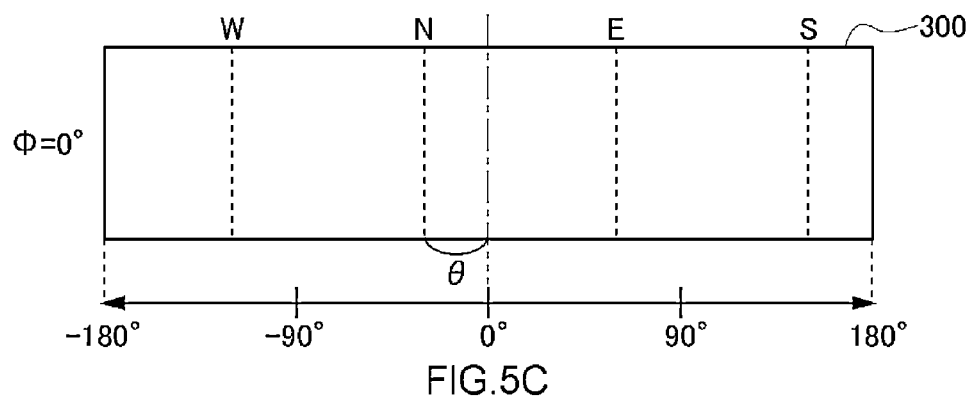

FIGS. 5A to 5C are illustrations with which to explain a panoramic image shot when the initial position of the camera 200 is in a direction of the azimuth angle θ.

As shown in the top view of FIG. 5A, the camera 200 in the initial position faces the direction 220 of azimuth angle θ. And as shown in the side view of FIG. 5B, the elevation angle of the camera 200 is φ=0°. With the elevation angle kept at φ=0°, an omnidirectional panoramic view is shot at the elevation angle φ=0° while the pan angle of the camera 200 with respect to the reference direction 220 is varied within a range of −180° to +180°. FIG. 5C is a panoramic image 300 taken in the above-described manner. At the center of the panoramic image 300, the pan angle is 0°. The left half of the panoramic image 300 is an image such that it is taken by varying the pan angle within a range of 0° to −180°. Similarly, the right half of the panoramic image 300 is an image such that it is taken by varying the pan angle within a range of 0° to 180°.

The central position of the pan angle 0° is displaced from true north by azimuth angle θ. Thus, the positions of north (N), south (S), east (E), and west (W) are those indicated by dotted lines. As long as the panoramic image 300 contains the azimuth angle θ of the central position of pan angle 0° as the information on the shooting orientations, the pixel positions of north (N), south (S), east (E), and west (W) can be evaluated in consideration of a displacement of the azimuth angle θ. Alternatively, instead of the azimuth angle θ, the coordinate values of pixel positions of north (N), south (S), east (E), and west (W) may be used as the information on the shooting orientations.

In order to obtain a spherical panoramic image, it is necessary to take images by varying the elevation angle of the camera 200. For example, if the angle of view of the camera 200 is 60°, a spherical panoramic image can be theoretically obtained as follows. That is, the camera 200 is tilted vertically at ±60°, and the similar image taking is done by varying the pan angle within a range of −180° to +180°.

Figure 6A:
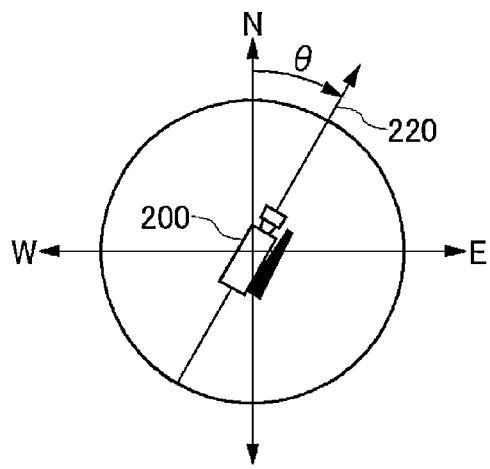
FIGS. 6A to 6C are illustrations with which to explain a panoramic image shot when a camera is in a direction of elevation angle φ=60°.
Figure 6B:
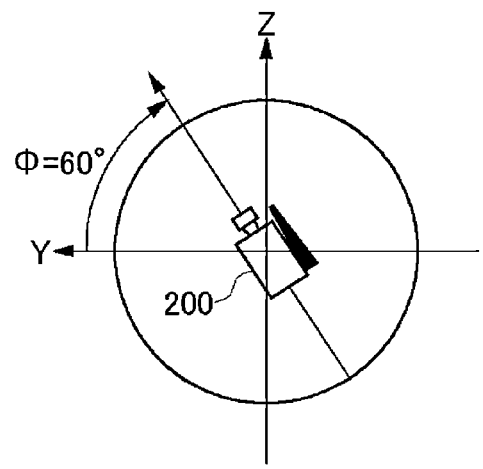
Figure 6C:
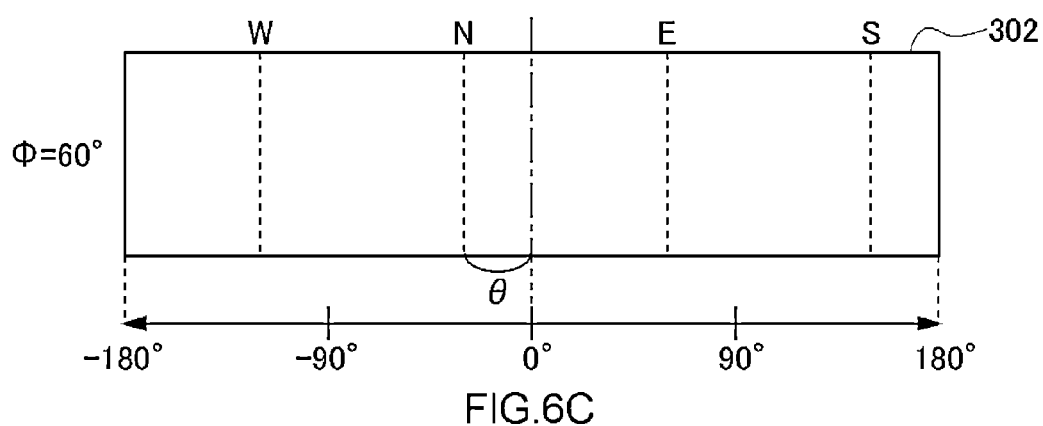

FIGS. 6A to 6C are illustrations with which to explain a panoramic image shot when a camera 200 is in a direction of elevation angle φ=60°. As shown in the top view of FIG. 6A, the camera 200 in the initial position faces the direction 220 of azimuth angle θ. And as shown in the side view of FIG. 6B, the elevation angle of the camera 200 is φ=0°. With the elevation angle kept at φ=60°, a panoramic view 302 as shown in FIG. 6C is shot at the elevation angle φ=60° while the pan angle of the camera 220 with respect to the reference direction 220 is varied within a range of −180° to +180°.

With the elevation angle kept at φ=−60°, a panoramic view 302 is similarly shot at the elevation angle φ=−60° while the pan angle is varied within a range of −180° to +180°. A spherical panoramic image is obtained by combining the panoramic images shot at the elevation angles φ=0°, 60°, and −60°. However, in implementation, a method is often employed where the vicinities of a boundary (bordering areas) are taken in an overlapped manner, in order to correct the mismatch caused by lens distortions when images are stitched together in boundary portions at the angle of view.

The spherical panoramic image obtained as described above is endowed with information on azimuth angles and elevation angles. Therefore, it is possible to identify the azimuth and elevation angle of an arbitrary pixel of the panoramic image based on the information. Also, the panoramic image is provided with the latitude and longitude information measured by GPS as the positional information of the shooting location. The additional information to be attached to the panoramic image may be recorded, for example, in the format of image file called Exif (Exchangeable Image File Format). The place-name of the shooting location can be recorded in a part of the file name, whereas the shooting date and time, the latitude and longitude of the shooting location, the altitude, the azimuth angle, and the like can be recorded as data in the Exif format. The elevation angle, which is not defined in the Exif format, is recorded as extended data.

Figure 7A:
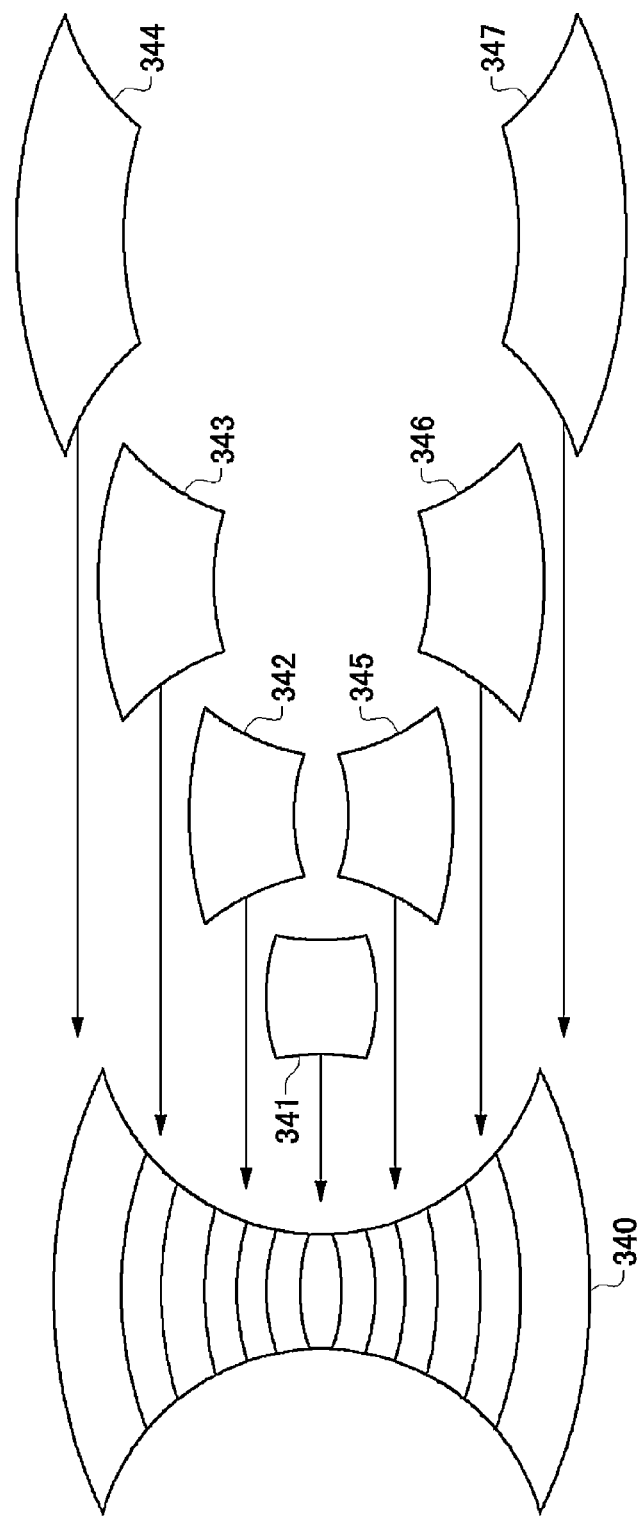
FIG. 7A explains a method of how a panoramic image is created by stitching a plurality of images together.
Figure 7B:
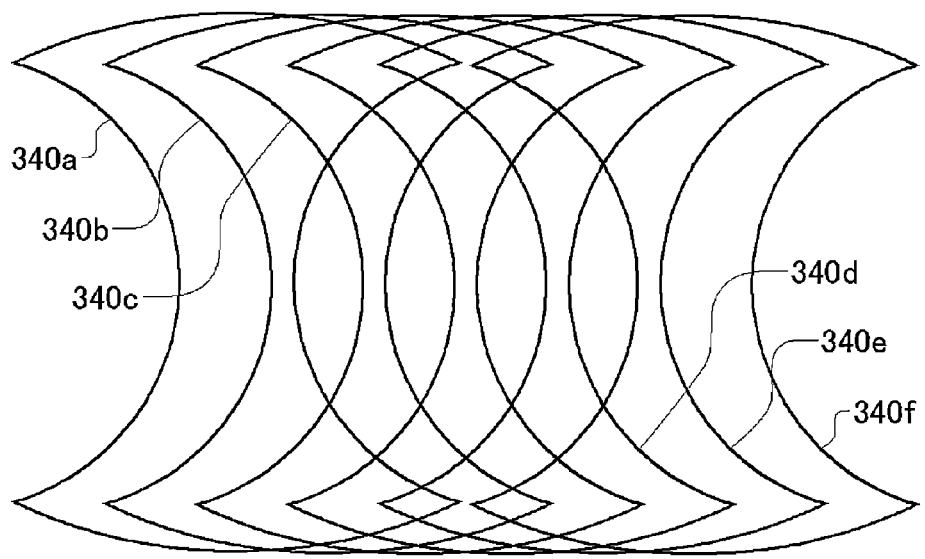
FIG. 7B explains a method of how a panoramic image is created by stitching a plurality of images together.

FIG. 7A and FIG. 7B are illustrations with which to explain a method of creating a panoramic image by stitching a plurality of images together.

In the example of FIG. 7A, seven images 341 to 347 shot by tilting (or panning) the camera 200 are mapped into a cylinder and then stitched together to prepare a cylindrical image 340. When the images are stitched together, the bordering areas of the images are overlapped with each other.

As shown in FIG. 7B, a plurality of cylindrical images like one shown in FIG. 7A are obtained in the panning (or tilting) direction by the shooting with the panning (or tilting) of the camera 200. An omnidirectional panoramic image 360 is finally obtained by synthesizing these cylindrical images 340a to 340f with the bordering areas of the images overlapped.

Figure 8:
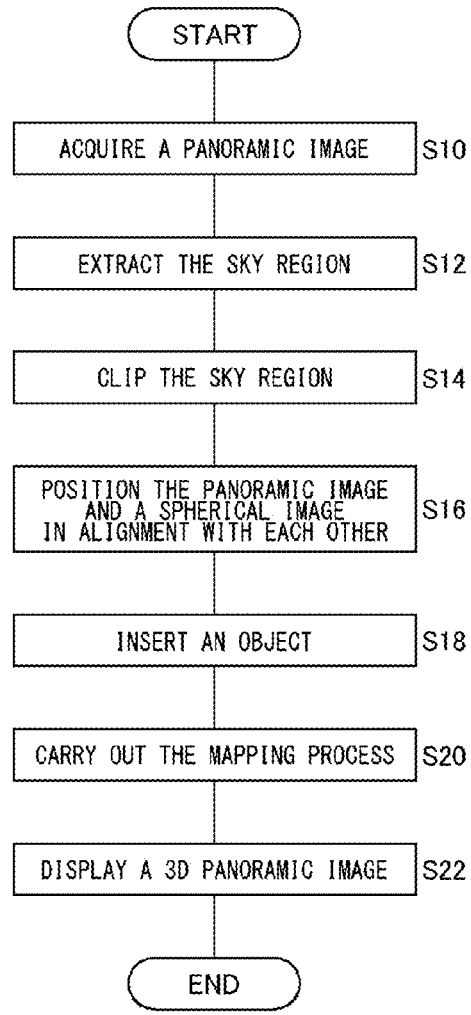
FIG. 8 is a flowchart showing a procedure for generating a panoramic image by the panoramic image display apparatus of FIG. 1.

FIG. 8 is a flowchart showing a procedure for generating a panoramic image by the panoramic image display apparatus 100. With reference to FIGS. 9A to 9E, FIG. 10 and FIGS. 11A and 11B, each step in the procedure for generating a panoramic image of FIG. 8 will be explained. In the flowchart shown in FIG. 8, the procedure of each structural component is shown using S (the capital letter of "Step"), which means a step, and numbers combined.

The panoramic image acquiring unit 10 acquires information on a panoramic image 400 shot and information on shooting orientations appended to the panoramic image 400 from the panoramic image/additional data storage 24 (S10).

Figure 9A:
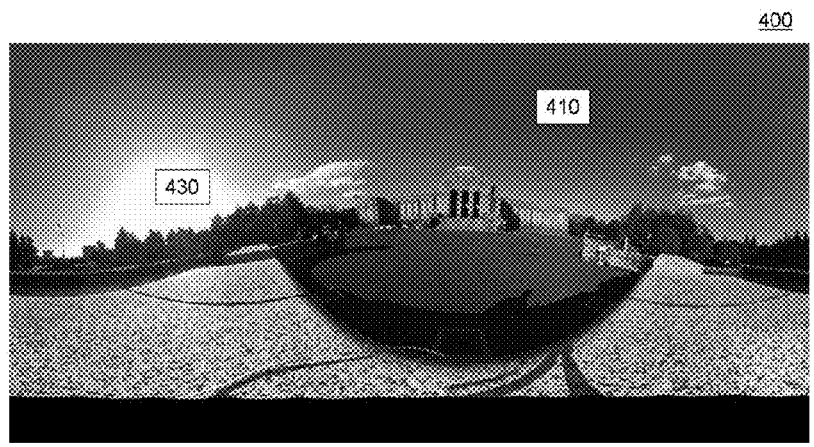
FIG. 9A shows an example of a panoramic image shot.

FIG. 9A shows an example of a panoramic image 400 shot. A building is captured in the center of the panoramic image, and the ground surface is captured in a lower part of the panoramic image. Sky 410 is captured in an upper part of the panoramic image, and clouds as well as the sun 430 are captured in the sky 410.

The mask region extraction unit 11 extracts the sky region of the panoramic image 400 as the region to be masked (S12). In order to extract the sky region from the panoramic image, the mask region extraction unit 11 uses a technique called segmentation and thereby segmentalizes or partitions the panoramic image into meaningful segments. The segmentation is a technique often used in the field of image recognition. In this technique of segmentation, regions corresponding respectively to objects within a given image are detected and the image is segmented. By the segmentation, the image is segmented into the regions for the respective objects, such as sky, building, ground, and persons.

Generally, the segmentation uses a clustering method. Since the pixels associated with the objects captured in the image share similar characteristics in color, brightness and the like, the image can be segmented into the regions corresponding respectively to the objects by clustering those pixels. A supervised clustering that gives correct answers as training data may be used. In the present embodiment, the training data is given when the user specifies several pixels belonging to the sky region in the panoramic image.

Figure 9B:
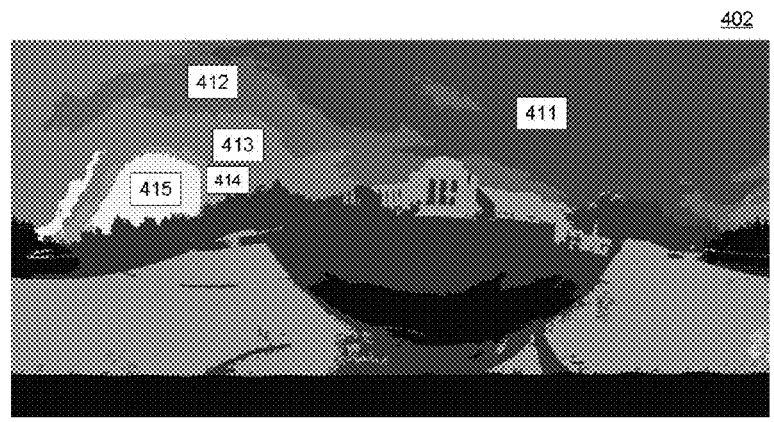
FIG. 9B shows a panoramic image that is segmented into segmented images by segmentation.

FIG. 9B shows a panoramic image 402 that is partitioned into segmented images by the segmentation. One can recognize that the panoramic image is segmentalized into the sky region, building region, ground region, and so forth by the segmentation.

As for the sky region 410, the sky region 410 is partitioned mainly into five regions denoted by the reference numerals 411 to 415, as shown in FIG. 9B, by the segmentation. Since the sun 430 is captured in the original panoramic image 400, the sky region 410 is detected as the five regions whose color vary in stages from blue to white in the order of the regions 411 to 415 and the sky region is not detected as a single region. Also, in the region 411, the region corresponding to the clouds is extracted as another segment and therefore the segment for the sky is not perfectly detected.

Nevertheless, a method is implemented, as follows, even though the segmentation result is incomplete as mentioned above. That is, if the color of the sky is specified and if the absolute value of difference between the color of pixel for each region and the specified color of the sky is less than a predetermined threshold value, the region will be determined to be the sky region. Thereby, for example, three regions 411, 412, and 413 out of the five regions may be detected as a single sky region altogether. Also, the region corresponding to the clouds within the region 411 may be deleted manually.

The segmentation is generally a time-consuming process. Thus the segmentation technique may be suitable for its use if the processing of panoramic images stored in the recording device can be executed using the idle time but it may not be very suitable if the processing of panoramic images shot has to be processed in real time. In the light of this, the mask region extraction unit 11 may use a filtering process, using a so-called bilateral filter, as alternative technique in place of the segmentation.

Figure 9C:
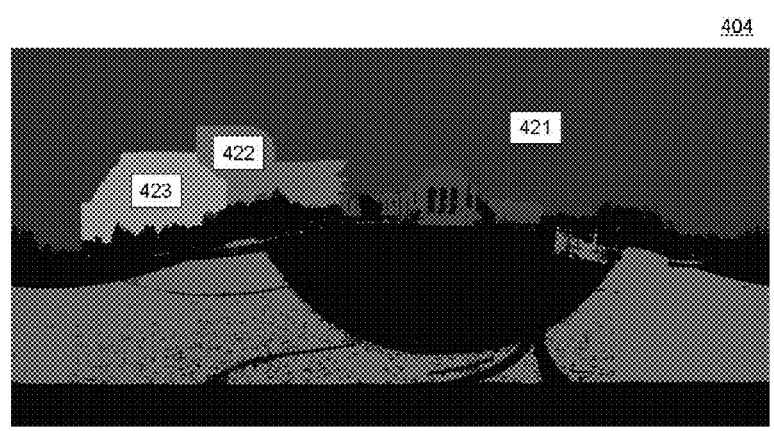
FIG. 9C shows a panoramic image that has been filtered.

FIG. 9C shows a panoramic image 404 that has been filtered. The pixels of the panoramic image 400 of FIG. 9A are planarized and the panoramic image 400 of FIG. 9A is also subjected to the bilateral filter through which edges are enhanced or preserved. As a result, as shown in FIG. 9C, the gradation of sky and the clouds disappear and therefore the sky region is detected as a single region 421. The region in which the sun 430 is captured is extracted as separated regions 422 and 423, having gradations therein, for instance.

If the absolute value of difference between the color of each pixel of the filtered panoramic image 404 and the color of the sky is less than a predetermined threshold value, the mask region extraction unit 11 will determine that the pixel belongs to the sky and thereby extract the sky region from the panoramic image 404. The color of the sky may be specified by the user or may be automatically set according to the weather or season at the time of image taking.

If, however, in this determination method, the color of pixels is close to the color of the sky, said pixels of an object other than the sky may be mistakenly selected as those belonging to the sky region. In order to avoid this problem, the mask region extraction unit 11 detects the horizon position in the panoramic image using the information on the elevation angle of the camera at the time of shooting, so that even though there is any pixel close to the color of the sky below the horizon, such a pixel is not detected as that belonging to the sky region. As a result, if, for example, the sea, pond, swimming pool or like object is captured in the panoramic image, the error of mistakenly determining the object to be the sky can be avoided.

Also, it is often the case that the sky is opened up above a person taking the image of a panoramic view, and the sky region is usually a continuously extending region having a certain large amount of space. Thus, the number of areas mistakenly determined to be the sky can be minimized with the help of knowledge that the sky region is generally continuous.

In the example of FIG. 9C, the mask region extraction unit 11 extracts regions 421, 422, and 423 including the region 422 and 423 that correspond to the sun 430, as the sky region.

Figure 9D:
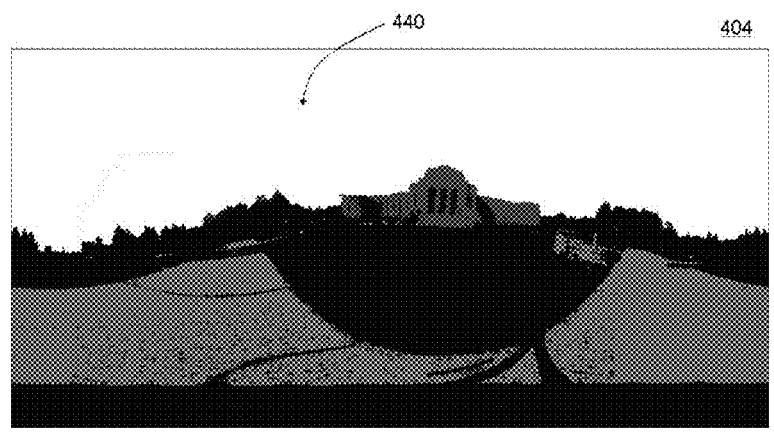
FIG. 9D shows a mask by which a sky region in a panoramic image is specified.

FIG. 9D shows a mask 440 by which the sky region in the panoramic image is specified. The mask region extraction unit 11 sets a sky region extracted from the filtered panoramic image 404 as the mask 440 and supplies the thus set sky region to the mask processing unit 12.

Referring back to the flowchart of FIG. 8, the mask processing unit 12 performs the mask processing on the panoramic image 400 using the mask 440 set by the mask region extraction unit 11 so as to clip the sky region (S14).

Figure 9E:
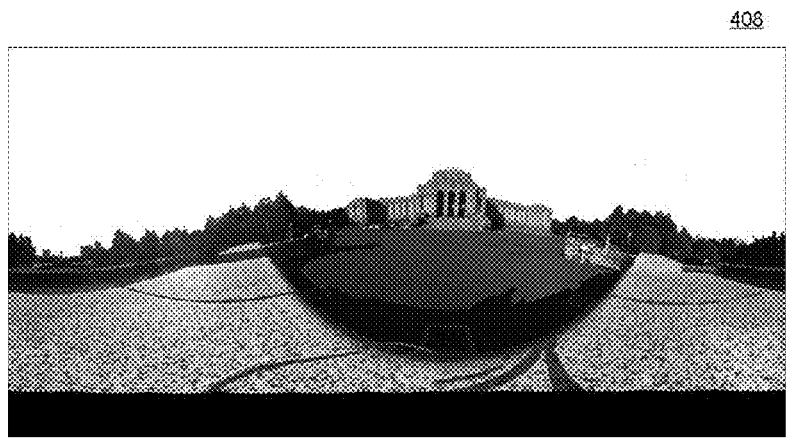
FIG. 9E shows a panoramic image obtained after the sky region has been mask-processed.

FIG. 9E shows a panoramic image 408 obtained after the sky region has been mask-processed. FIG. 9E is the image obtained when the sky region 410 has been clipped from the original panoramic image 410.

Next, the positioning unit 20 aligns the shooting direction of the panoramic image mapped onto the 3D panoramic space and the direction of the spherical image mapped onto the same 3D panoramic space with each other (S16). The object insertion unit 22 places an object to be inserted outside or inside the 3D panoramic space as necessary (S18).

Figure 10:
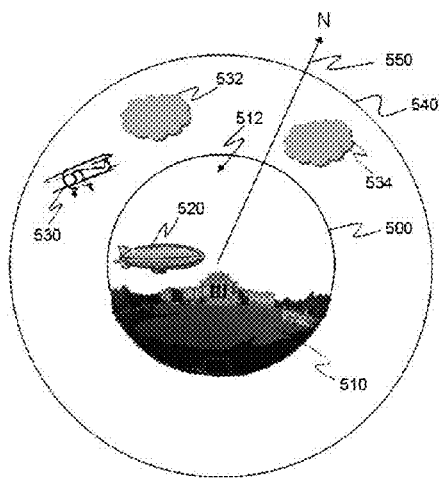
FIG. 10 is a diagram for explaining a relation between a sphere and a 3D panoramic image into which a panoramic image is mapped.

FIG. 10 is a diagram for explaining a relation between a sphere and a 3D panoramic image 408 into which the mask-processed panoramic image 408 is mapped.

A panoramic image 510, whose sky region 512 has been made transparent by the mask processing, is mapped into a panoramic sphere 500 that is an exemplary 3D panoramic space. The center of the panoramic sphere 500 is the shooting location of the panoramic image, namely the viewpoint position. A sphere (celestial sphere) 540 is provided outside the panoramic sphere 500 with the viewpoint position of the panoramic sphere 500 as the center. A spherical image including clouds 532 and 534, the sun and the like are set on the surface of the sphere 540. The spherical image may be selected from the images stored in the spherical image data storage 26, and a spherical image of starry sky where stars and the moon are rendered may be used.

The panoramic image 510 mapped into the panoramic sphere 500 and the spherical image set on the surface of the sphere 540 are adjusted by rotating the panoramic sphere, into which the panoramic image is mapped, in such a manner that the orientations of their North Stars agree with each other. If the direction may be ignored, the processing of positioning the panoramic image 510 and the spherical image will not be required. If, however, no processing of positioning the panoramic image 510 and the spherical image is done, the sun, the moon and stars rendered on the celestial space will appear in a direction different from the shooting direction of the panoramic image and therefore a composite image may look unnatural as a whole.

An airship 520 and an airplane 530 are exemplary objects inserted into the panoramic image. The airplane 530 is placed between the sphere 540 and the panoramic sphere 500. In other words, the airplane 530 is placed outside the panoramic sphere 500. The airship 520 is placed inside the panoramic sphere 500. If the user wishes to insert an object at a distant view, the object will be placed outside the panoramic sphere 500. If he/she wishes to insert the object at a new view, the object will be placed inside the panoramic sphere 500. The airship 520 and the airplane 530 move within the sphere 540 according to their motion models.

Referring back to FIG. 8, the mapping processing unit 14 maps the mask-processed panoramic image 510 and the spherical image rendered in the sphere 540 onto the panoramic sphere 500. Also, the mapping processing unit 14 maps the objects, such as the airship 520 and the airplane 530, onto the panoramic sphere 500 (S20).

The sky region of the panoramic image 512 is clipped and is now a transparent region as viewed from the center of the panoramic sphere 500, namely the viewpoint position. Thus, a spherical image rendered on the surface of the sphere 540 is seen in the sky region 512. The airplane 530 located outside the panoramic sphere 500 is seen at a far point beyond the sky region 512 but cannot be seen when the airplane 530 is blocked by the building captured in the panoramic image. At the same time, the airship 520 located inside the panoramic sphere 500 is seen at a short-distant point and may be seen in front of the building in some cases.

In order to reproduce an image as viewed from the center of the panoramic sphere 500, the mapping processing unit 14 maps images, starting from an image located outermost from the viewpoint, into the panoramic sphere 500 and renders them in a superimposed manner. First, a spherical image rendered in the sphere 540 is mapped into the panoramic sphere 500 and, on top of it, the airplane 530 placed outside the panoramic sphere 500 is mapped into the panoramic sphere 500. Then the mask-processed panoramic image 510 is mapped into the panoramic sphere 500. Finally the airship 520 placed inside the panoramic sphere 500 is mapped into the panoramic sphere 500. As a result, the spherical image is pasted to the transparent sky region 512 of the panoramic image 510 so that the spherical image can be peeked through the sky region 512. Also, the airplane 530 outside the panoramic sphere 500 is pasted to a distant view and the airship 520 inside the panoramic sphere 500 is pasted to a near view.

Figure 11A:
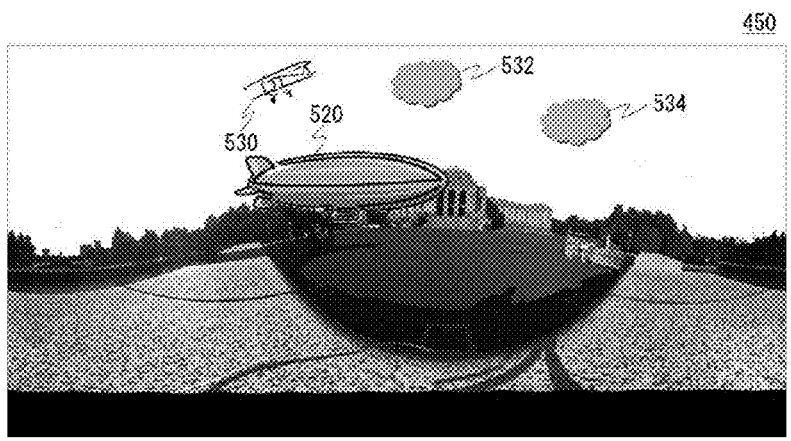
FIG. 11A shows an example where a spherical image has been pasted to the sky region of the mask-processed panoramic image of FIG. 9E.

FIG. 11A shows an example where the spherical image has been pasted to the sky region of the mask-processed panoramic image 408 of FIG. 9E. A spherical image including the clouds 532 and 534 is pasted to the sky region of the panoramic image 450 of the FIG. 11A. Also, the airplane 530 is inserted to a distant view, and the airship 520 is inserted to a new view in front of the building.

Figure 11B:
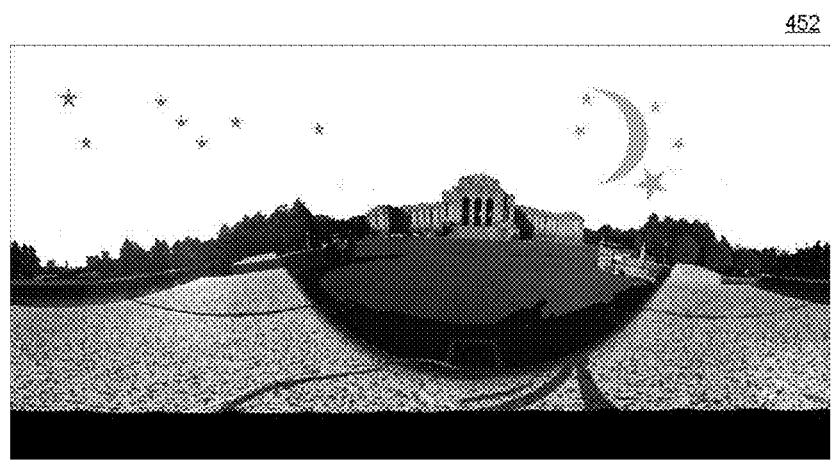
FIG. 11B shows an example where a starry sky image has been pasted to the mask-processed panoramic image of FIG. 9E.

FIG. 11B shows, as another exemplary spherical image, an example where a starry sky image has been pasted to the mask-processed panoramic image of FIG. 9E. A spherical image including the moon and stars is pasted to the sky region of the panoramic image 408. The phases of the moon and the constellation of stars in the sky are adjusted according to the data and time when the panoramic image is displayed, so that a realistic night sky can be shown in the sky region of the panoramic image.

In the present embodiment, the sphere 540 is provided outside the panoramic sphere 500 into which the panoramic image is mapped, so that the spherical image rendered in the sphere 540 can be changed independently of the panoramic image and then the spherical image can be combined with the panoramic image.

For example, the user may adjust the motion of constellation of stars rendered in the celestial sphere by operating the R1/R2 buttons 151 and 152 of the controller 102. For example, pressing the R1 button 151 will advance date and time, and pressing the R2 button 152 will return date and time, so that the constellation of starts in different reasons can be displayed in the sky region.

Referring back to the flowchart of FIG. 8, the 3D image generator 16 generates a 3D panoramic image when a 3D panoramic sphere having the mask-processed panoramic image 510, an image of the sphere 540 and objects such as the airship 520 and the airplane 30 mapped thereon is viewed in a specified line of sight, and the display control unit 18 displays the thus generated 3D panoramic image (S22).

As described above, by employing the panoramic image display apparatus according to the present embodiment, the sky region of a panoramic image can be clipped and replaced with another spherical image. For example, even though the panoramic image is shot on a rainy day, the sky region can be clipped and then replaced with a fine blue sky or a sky with the sun rising up can be changed to a sky with the sun setting down, thereby bringing diversity to the panoramic image after the actual image taking. Also, a virtual object such as an airplane and a satellite can be inserted to the panoramic image, thus excelling in quality of entertainment. The present embodiment may be used in the technical field of so-called augmented reality (AR) in which virtual world information and real world information are merged with each other. That is, a panoramic image, such as a starry sky, which is created virtually based on a real-world panoramic image is superimposed onto the real-world panoramic image, so that a virtual real world in which the real environment is augmented by the virtual information can be created.

The present invention has been described based upon illustrative embodiments. These embodiments are intended to be illustrative only and it will be obvious to those skilled in the art that various modifications to the combination of constituting elements and processes could be developed and that such modifications are also within the scope of the present invention.

In the foregoing description, the mask-processed panoramic image and the spherical image are mapped into a 3D panoramic image, such as the surface of a sphere, and then a 3D image, when the 3D panoramic space is viewed in a specified line of sight, is displayed on the screen. However, an image obtained when a virtual image is superimposed onto the mask region may be simply displayed two-dimensionally. In this case, the mapping processing unit 14 and the 3D image generator 16 are no longer necessary, thus simplifying the panoramic image display apparatus 100. Not only the virtual image may be merged into or combined with the panoramic image off-line but also an augmented-reality image in which the mask region of the panoramic image has been replaced with the virtual image on-line may be displayed on a display device such as a transparent display wearable by the user.

In the above-described embodiments, the sky region of a panoramic image shot outdoors is extracted as the region to be masked. If, for example, the panoramic image is one for which the sports activity like baseball is shot in a stadium with a dome-shaped roof, the region of the dome-shaped roof may be extracted as the region to be masked. Clipping the region of the dome-shape region and then pasting a spherical image to the region can make the image seem as if the baseball were being played outdoors. In clipping the region of the dome-shaped region, a region shot at a predetermined elevation angle of the camera or a region at an altitude of more than a predetermined altitude is preferably extracted as the region to be masked, for instance. Also, a region whose color barely changes or a region having a predetermined area may be extracted as the region to be masked. For example, window-panes of a building may be masked, then the regions corresponding to the windows may be clipped, and another image may be pasted thereonto. A building where no people are may be virtually seemed as if there were people inside, or the scene outside the building that can be seen from the window may be changed. Also, the sea, pond or desert may be extracted as the region to be masked. Tokyo Bay may be replaced by South Pacific Ocean or a desert may be replaced by the image of green land.

Panoramic images herein are not limited to ones shot by the omnidirectional image shooting system as shown in FIG. 3, but they may be ones shot through a fish-eye lens or ones merged or brought together from a plurality of images shot with a normal digital camera in different shooting directions.

In the above-described embodiments, when the mask-processed panoramic image and the spherical image are to be displayed such that they are superimposed on each other, the images are rendered such that the images, starting from an image located outermost from the viewpoint, are mapped into the 3D panoramic sphere. That is, the spherical image is mapped to the 3D panoramic sphere and then the panoramic image, where the mask region has been clipped and therefore the clipped region is transparent, is mapped into the 3D panoramic sphere in a superimposed manner. Another mapping method may be implemented instead. That is, a region corresponding to the mask may be clipped from the spherical image and then a spherical image corresponding to the mask may be pasted onto the mask region of the panoramic image mapped into the 3D panoramic sphere.

In general, image discontinuity occurs on a boundary portion of the mask region because of the synthesis of the panoramic image and the spherical image, thus giving an unnatural impression. In the light of this, an image of the mask region may be passed through a Gaussian filter so as to be smoothed out. And the panoramic image and the spherical image may be alpha-blended near the boundary of the mask region, so that the boundary may be made blurry.

Of the functional components of the panoramic image display apparatus 100, the components related to a function for mainly performing the masking processing of a panoramic image and superimposing a spherical image and/or virtual image onto the mask region of the panoramic image may be implemented to a server. And the components related to a function for mainly viewing the panoramic image onto which the spherical image and/or virtual image have/has been superimposed may be implemented to a client. Thereby, the panoramic image display apparatus 100 can be realized as a server-client system via a network. The server may carry out the mask processing after the mask region of panoramic image has been extracted and then superimpose the spherical image and/or virtual image onto the mask region. And an interface with which to view the panoramic view the panoramic image, onto which the spherical image and/or virtual image have/has been superimposed, may be provided to the client. There may be provided an interface with which the user specifies a specific region of the panoramic image on a display screen as a region to be masked. Also, the client may receive the data of the panoramic image and the spherical image from the server, adjust the positioning of the spherical image and the panoramic image, as appropriate, and superimpose the spherical image onto the panoramic image. This allows the user to freely rotate the spherical image and allows the thus rotated panoramic image to be superimposed onto the panoramic image.

The "panoramic image" as used in this patent specification is not limited to a "panorama" image in the narrow sense, namely a horizontally or vertically long image or a panoramic view of 360 degrees, but simply an image that covers a wide range of area. Also, explained in the embodiments is an example where the moving images are pasted on the panoramic image, which is an object image. Note that the object image does not have to be a so-called panoramic image and that the present invention is applicable to a normal image of arbitrary size serving as the object image. Or the object image may be an image where a plurality of images having different resolutions are hierarchized. Such a hierarchized image may be constructed such that when a partial region of image is enlarged, the enlarged region is replaced by an image of a higher resolution. Also, "spherical image (celestial image)" is not necessarily limited to an image assuming an object image is of a "sphere" or a "spherical surface" but simply an image including the sky and the like.

The invention claimed is:

1. An image display apparatus comprising:
a storage configured to store an object image, associated with information on a shooting direction, a first virtual spherical image having a first three dimensional (3D) inner surface, associated with first directional information, and a second virtual spherical image having a second 3D inner surface, associated with second directional information, where the first virtual spherical image and the second virtual spherical image are in the form of spheres;
a mask region extraction unit configured to extract a region that is to be masked in the object image;
a mask processing unit configured to generate the object image where the region to be masked in the object image is masked;
a positioning unit configured to adjust the first directional information of the first virtual spherical image to be the shooting direction of the object image;
a mapping processing unit configured to: (i) position the first virtual spherical image centered within the second virtual spherical image about a central point such that the first directional information and the second directional information align, (ii) map the mask-processed object image onto the first 3D inner surface of the first spherical virtual image such that the shooting direction and the first directional information are aligned, (iii) map at least one first virtual object onto the first 3D inner surface of the first virtual spherical image when a distance from the central point to the at least one first virtual object is within the first virtual spherical image, and (iv) map at least one second virtual object onto the second 3D inner surface of the second virtual spherical image when a distance from the central point to the at least one second virtual object is outside the first virtual spherical image such that the at least one second virtual image appears in the mask area from the viewer's point of view in the shooting direction in a three-dimensional (3D) object space;
a three-dimensional (3D) image generator configured to generate a three-dimensional (3D) object image, when the 3D object image mapped by the mapping processing unit is viewed in a specified line of sight in such a manner so as to regard a shooting location of the object image as a viewpoint position; and
a display control unit configured to display the 3D object image on a screen.

2. An image display apparatus according to claim 1, wherein the mask region extraction unit extracts a sky region in the object image, as the region to be masked, and
wherein the mask processing unit generates the object image where the sky region in the object image is masked.

3. An image display apparatus according to claim 2, wherein the mask region extraction unit determines a horizon position in the object image based on information on an elevation angle of a camera at the time of shooting, and
the mask region extraction unit extracts the sky region in a region above the horizon position.

4. An image display apparatus according to claim 1, wherein the mapping processing unit generates an image onto the 3D object space, in which part of the spherical image is pasted onto the region to be masked in the object image, by mapping the mask-processed object image onto the 3D object space in a manner such that the mask-processed object image is superimposed onto the 3D object space where the spherical image is mapped.

5. An image display apparatus according to claim 1, further comprising an object insertion unit configured to place the at least one virtual object onto the one of the first and second 3D inner surfaces based on the distance from the central point, wherein the mapping processing unit maps the at least one object onto the 3D object space.

6. An image display apparatus according to claim 5, wherein, when the at least one virtual object is placed onto the second 3D inner surface, which is outside the 3D object space, the mapping processing unit generates an image onto the 3D object space, in which the object is synthesized with the object image, by mapping the mask-processed object image onto the 3D object space in a manner such that the mask-processed object image is superimposed onto the 3D object space where the object is mapped.

7. An image display apparatus according to claim 5, wherein, when the at least one virtual object is placed onto the first 3D inner surface, which is inside the 3D object space, the mapping processing unit generates an image onto the 3D object space, in which the object is synthesized with the object image, by mapping the object onto the 3D object space in a manner such that the object is superimposed onto the 3D object space where the mask-processed object image is mapped.

8. An image display apparatus according to claim 1, wherein the object image is a panoramic image and the 3D object space is a 3D panoramic space.

9. An image display apparatus comprising:
a storage configured to store an object image, associated with information on a shooting direction, a first virtual image having a first 3D inner surface, associated with first directional information, and a second virtual image having a second 3D inner surface, associated with second directional information, where the first virtual image and the second virtual image are in the form of spheres;
a mask region extraction unit configured to extract a region that is to be masked in the object image;
a mask processing unit configured to generate the object image where the region to be masked in the object image is masked;
a positioning unit configured to adjust the first directional information of the first virtual image to the shooting direction of the object image; and
a display control unit configured to: (i) position the first virtual image centered within the second virtual image about a central point such that the first directional information and the second directional information align, (ii) map the mask-processed object image onto the first 3D inner surface of the first virtual image such that the shooting direction and the first directional information are aligned, (iii) map at least one first virtual object onto the first 3D inner surface of the first virtual spherical image when a distance from the central point to the at least one first virtual object is within the first virtual spherical image, (iv) map at least one second virtual object onto the second 3D inner surface of the second virtual spherical image when a distance from the central point to the at least one second virtual object is outside the first virtual spherical image such that the at least one second virtual image appears in the mask area from the viewer's point of view in the shooting direction in a three-dimensional (3D) object space, and (v) display on a screen an augmented-reality image where the virtual image is superimposed onto the mask-processed object image.

10. An image display apparatus according to claim 9, wherein the object image is a panoramic image.

11. An image generation method comprising:
reading out, by a processor, an object image, a first virtual spherical image, and a second virtual spherical image to be displayed, from a storage device for storing the object image, associated with information on a shooting direction, the first virtual spherical image having a first 3D inner surface, associated with first directional information, and the second virtual spherical image having a second 3D inner surface, associated with second directional information, where the first virtual spherical image and the second virtual spherical image are in the form of spheres such that each of the first and second virtual spherical images are round and characterized in that all points of a surface thereof are equidistant from a center thereof;

specifying, by a processor, a region that is to be masked in the object image;

adjusting, by a processor, the first directional information of the first virtual spherical image to the shooting direction of the object image;

positioning the first virtual spherical image centered within the second virtual spherical image about a central point such that the first directional information and the second directional information align;

mapping the mask-processed object image onto the first 3D inner surface of the first spherical virtual image such that the shooting direction and the first directional information are aligned;

mapping at least one first virtual object onto the first 3D inner surface of the first virtual spherical image when a distance from the central point to the at least one first virtual object is within the first virtual spherical image;

mapping at least one second virtual object onto the second 3D inner surface of the second virtual spherical image when a distance from the central point to the at least one second virtual object is outside the first virtual spherical image such that the at least one second virtual image appears in the mask area from the viewer's point of view in the shooting direction in a three-dimensional (3D) object space; and rendering, by a processor, the first virtual spherical image superimposed onto the region to be masked in the object image.

12. A non-transitory computer-readable medium encoded with a program, the program comprising:

a reading module operative to read out an object image, a first virtual spherical image, and a second virtual spherical image to be displayed, from a storage device for storing the object image, associated with information on a shooting direction, the first virtual spherical image having a first 3D inner surface, associated with first directional information, and the second virtual spherical image having a second 3D inner surface, associated with second directional information, where the first virtual spherical image and the second virtual spherical image are in the form of spheres such that each of the first and second virtual spherical images are round and characterized in that all points of a surface thereof are equidistant from a center thereof;

a mask region extraction module operative to extract a region that is to be masked in the object image;

a mask processing module operative to generate the object image where the region to be masked in the object image is masked;

a positioning module operative to adjust the first directional information of the first virtual spherical image to the shooting direction of the object image;

a positioning module operative to position the first virtual spherical image centered within the second virtual spherical image about a central point such that the first directional information and the second directional information align;

a mapping processing module operative to: (i) map the mask-processed object image onto the first 3D inner surface of the first spherical virtual image such that the shooting direction and the first directional information are aligned, and (ii) map at least one first virtual object onto the first 3D inner surface of the first virtual spherical image when a distance from the central point to the at least one first virtual object is within the first virtual spherical image, and (iii) map at least one second virtual object onto the second 3D inner surface of the second virtual spherical image when a distance from the central point to the at least one second virtual object is outside the first virtual spherical image such that the at least one second virtual image appears in the mask area from the viewer's point of view in the shooting direction in a three-dimensional (3D) object space; and a 3D image generation module operative to generate a three-dimensional (3D) object image, when the three-dimensional object image mapped by the mapping processing module is viewed in a specified line of sight in such a manner so as to regard a shooting location of the object image as a viewpoint position.

* * * * *